US009747791B2

(12) United States Patent
Mayer et al.

(10) Patent No.: US 9,747,791 B2
(45) Date of Patent: Aug. 29, 2017

(54) METHOD FOR IDENTIFYING PARKING AREAS AND/OR FREE SPACES

(71) Applicant: Robert Bosch GmbH, Stuttgart (DE)

(72) Inventors: Philipp Mayer, Stuttgart (DE); Manuel Maier, Esslingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/135,194

(22) Filed: Apr. 21, 2016

(65) Prior Publication Data

US 2016/0321926 A1 Nov. 3, 2016

(30) Foreign Application Priority Data

Apr. 28, 2015 (DE) ........................ 10 2015 207 804

(51) Int. Cl.
*B60Q 1/48* (2006.01)
*G08G 1/01* (2006.01)
*G08G 1/14* (2006.01)

(52) U.S. Cl.
CPC ......... *G08G 1/0112* (2013.01); *G08G 1/0129* (2013.01); *G08G 1/0141* (2013.01); *G08G 1/143* (2013.01); *G08G 1/147* (2013.01)

(58) Field of Classification Search
CPC ...... G08G 1/142; G08G 1/168; G08G 1/0112; G08G 1/0129; G08G 1/147; G08G 1/143; G08G 1/0141
USPC ..... 340/932.2, 870.07; 701/30.6, 454; 705/5
See application file for complete search history.

(56) References Cited

U.S. PATENT DOCUMENTS

2014/0097971 A1* 4/2014 Barth .................. G01S 7/52004 340/932.2
2015/0379873 A1* 12/2015 Tippelhofer ........... G08G 1/143 340/932.2
2016/0098929 A1* 4/2016 Nakhjavani ............ G08G 1/144 340/932.2

FOREIGN PATENT DOCUMENTS

DE 102013018721 6/2014
DE 102014009627 11/2014
WO 2012/019628 2/2012

* cited by examiner

*Primary Examiner* — Dhaval Patel
(74) *Attorney, Agent, or Firm* — Norton Rose Fulbright US LLP; Gerard Messina

(57) ABSTRACT

A method for identifying free spaces (parking not permitted) and/or permitted parking areas, vehicles transmitting pieces of information about possible parking spaces (PPS) to a central computer facility (CCF). Positions of PPS are detected with vehicle surroundings sensors, and the detected PPS are evaluated based on the data collected, a categorization being performed for recording the PPS, with positions, in a CCF database and evaluating the data using a cluster analysis. When the analysis is performed, PPS are assigned to a street portion, a function is assigned to the street portion, which is given by the quotient of the frequency of PPS detections in a certain position along the street portion and the number of vehicle passages through the street portion and a weighting factor from the evaluation. A free space is inferred when the function value is greater than a predefined second limiting value and/or a parking area is inferred when the function value is within a predefined range. Also described is a device for assisting a driver, a central computer facility, and a related computer program.

13 Claims, 4 Drawing Sheets

METHOD FOR IDENTIFYING PARKING AREAS AND/OR FREE SPACES

FIELD OF THE INVENTION

The present invention relates to a method for identifying free spaces in which parking is not permitted and/or parking areas in which parking is permitted. Further aspects of the present invention relate to a computer program, to a central computer facility, and to a device configured to carry out the method.

BACKGROUND INFORMATION

A variety of driver assistance systems are used in the automotive field, which are intended to assist the driver with carrying out various driving maneuvers. These include, for example, parking assistance systems which, with the aid of sensors assigned to the vehicle, detect the surroundings, ascertain possible parking spaces in the surroundings, and assist the driver during parking. Furthermore, driver assistance systems are known in the related art which assist the driver with locating suitable free parking spaces.

A method for reporting a free parking spot for a vehicle is discussed in DE 10 2014 009 627 A1. It is provided to identify free parking spaces with the aid of vehicle-internal sensors and with the aid of attributes such as length, width, height, angle, type, and geographical position. A free parking space is also established when a previously occupied parking spot is cleared. Additionally, further sensors may be used to identify traffic signs, for example to consider pieces of information from signage. Moreover, a linkage to a digital road map is additionally provided to preclude the use of areas which are situated too close to an intersection, for example. Relevant parking spots are reported to other vehicles, with either a direct communication between two vehicles or a central server being used for this purpose.

A method for identifying at least one parking spot for a motor vehicle is discussed in DE 10 2013 018 721 A1. In the method, an occupancy grid is created, into which sensor data of at least one distance-measuring sensor are entered. Based on the sensor data, objects are identified and subsequently classified, for example as a car class and as a non-car class. This makes it possible to identify a gated entrance, for example, since generally no parking automobile is identified in the vicinity of such a gated entrance.

A method for identifying parking spaces based on collected GPS data is discussed in WO 2012/019628 A1. GPS data of a navigation system are superimposed on a digital map, clusters which point to possible parking spaces being displayed. Data on the parking space are extracted from the collected data, such as the type of the parking space or the average parking duration.

SUMMARY OF THE INVENTION

A method for identifying free spaces in which parking is not permitted and/or parking areas in which parking is permitted is provided, vehicles transmitting pieces of information about possible parking spaces to a central computer facility. In the method, positions of possible parking spaces are detected with the aid of surroundings sensors of the vehicles. This is followed by an evaluation of the detected possible parking spaces based on the data collected by the surroundings sensors, a categorization being carried out. The possible parking spaces are recorded in a database of the central computer facility, together with their positions and further data if necessary. The data stored in the database are evaluated using a cluster analysis. It is provided that possible parking spaces are assigned to a street portion. A function is in turn assigned to the street portion, which is given by the quotient of the frequency of the detections of a possible parking space in a certain position along the street portion and the number of passages of vehicles through the street portion and a weighting factor formed from the categorization of the possible parking spaces. The presence of a free space is inferred when the function value is greater than a predefined limiting value and/or the presence of a parking area is inferred when the function value is within a predefined range.

The free spaces identified by the method are, for example, entrances, gateways, fire department access lanes, median strips or reserved parking spaces, such as handicapped parking spaces. While these free spaces are, in principle, suitable for parking a vehicle thereon in terms of their size, they do not, however, represent a permissible parking area.

A street portion is defined as a street section which is delimited at both ends. Such a delimitation may exist in the form of an intersection, or in the case of a cul-de-sac by the end of the street. In one variant of the method, it is conceivable to assign a digital street map to the central computer facility, in which streets and their coordinates are stored for a satellite navigation system. The street portions may then be extracted from the digital street map by identifying delimited street sections. It is furthermore conceivable to extract the street portions based on the data transmitted to the central computer facility. For this purpose, the positions of all possible parking spaces transmitted to the central computer facility are entered into a map, and the fact that possible parking spaces may often only be situated along the curb of a street is taken advantage of.

In one specific embodiment, exactly one street portion is assigned to each street section for each side of the street, so that a one-way street has exactly one street portion, and a street which is accessible in both directions has exactly two street portions, namely one for each driving direction.

After the possible parking spaces have been assigned to the street portions, a function is assigned to each street portion, which is defined by the quotient of the frequency of the detections of a possible parking space in a certain position along the street portion and the number of passages of vehicles through this street portion and a weighting factor. In this way, a function is created, which may assume a value between 0 and 1 for each position along the street portion. The value 0 denotes that a possible parking space has never been detected in the particular position along the street portion, while a value of 1 indicates that each vehicle which has driven through the street portion has ascertained a possible parking space in the given position.

If the function value is close to 1, this means that while a possible parking space is ascertained very frequently, this space is never used or very rarely. As a result, the probability that the possible parking space is a free space, and consequently no permissible parking space is present, is very high. Thus, if the function value exceeds the predefined limiting value for a position along the street portion, the presence of a free space is inferred. The limiting value is selected from the range of 0.5 to 0.99, for example, which may be from the range of 0.6 to 0.9, and particularly from the range of 0.7 to 0.8.

If the function value is within a predefined range whose upper limit is below the limiting value, the presence of a parking area may be inferred. The predefined range for the presence of a parking area may be from 0.1 to 0.5, particularly from 0.1 to 0.4.

With the aid of the customary surroundings sensors used in connection with parking assistance systems, a distinction between such a free space and a permissible parking space is often not possible. It is therefore provided in the method according to the present invention that vehicles which are equipped with surroundings sensors detect possible parking spaces in their surroundings. Suitable surroundings sensors include radar, LIDAR, ultrasonic sensors or camera systems. If the surroundings sensors are configured as distance sensors, for example, in particular ultrasound-based distance sensors, a vehicle identifies possible parking spaces in that typically at least one of the distance sensors is situated on the vehicle oriented to the side, and the vehicle passes by the possible parking spaces. The surroundings sensors of the vehicles may be configured as distance sensors, possible parking spaces being detected during passing.

For the detection of a possible parking space, multiple parameters are determined via the surroundings sensors of the vehicles. These parameters include in particular reference objects which delimit the possible parking space. In the case of parking spaces which abut a street, there is a first reference object, which rearwardly delimits the possible parking space, a second reference object, which forwardly delimits the possible parking space, and a lateral reference, which delimits the parking space to the side facing away from the middle of the street, with respect to the driving direction through the street. The first and second reference objects are parking vehicles, for example, and the lateral reference is a curb, for example. A classification may be carried out whereby, for example, for the first and second reference objects, a classification into the classes “no reference object present,” “vehicle,” and “unknown” may be carried out. With respect to the lateral reference object, a classification into the classes “no curb present,” “curb,” “high object,” and “unknown” may be carried out, for example. A “high object” may be a wall, for example.

The position of a possible parking space may be determined using a position ascertained by the surroundings sensors relative to the vehicle and a vehicle position ascertained with the aid of satellite navigation. With the aid of the surroundings sensors of the vehicle, the position of a possible parking space is initially ascertained relative to the proprietary position of this vehicle. The proprietary position of the vehicle, in turn, may be ascertained with the aid of satellite navigation, so that an absolute position indication is assigned to a possible parking space.

By evaluating the positions and sizes, in particular the length with respect to the driving direction of the reference objects, it is possible to estimate the position and size of the possible parking space. The size of the possible parking space may also be used to infer whether the possible parking space is a cross parking spot or a parallel parking spot. In the case of parallel parking spots, the vehicle is parked parallel to the driving direction, and in the case of cross parking spots, it is parked transversely to the driving direction. If it is established that the width of a possible parking space, i.e., the dimension of the parking space transverse to the driving direction, is smaller than a vehicle length, a parallel parking spot is inferred. If, in turn, the width of a possible parking space is larger than a vehicle length, the presence of a cross parking spot is inferred.

The detection of a possible parking space is followed by an evaluation of this possible parking space based on the data collected by the surroundings sensors. It is provided to carry out a categorization based on the collected data. For this purpose, categories are formed for predefined parking space parameters. Certain categories indicate an increased probability of the presence of a permissible parking space. Parking space parameters include the length of a parking space, the width of a parking space, the side of the street on which the possible parking space is situated, the parking space orientation, the measuring error, and the types of reference objects of the possible parking space. For the categorization of constant parking space parameters such as the parking space length or parking space width, parking space length intervals and parking space width intervals are predefined, and each interval is assigned to a category.

The categorization may be used to assign a probability of the presence of a permissible parking space to possible parking spaces. The probability of the presence of a permissible parking space is increased when one or multiple of the following factors are present: the identification of a possible parking space on the right side of the street (or on the left side of the street in the case of left-hand traffic), the presence of a first and a second reference object, which were both classified as vehicles, a detected curb, or a small distance between the vehicle and the possible parking space. Furthermore, the probability is increased when the surroundings sensors report no or only a small measuring error for the collected data. The error in the collection of the data is typically small when a high number of sensor data is available. For example, if the surroundings sensors are configured as ultrasound-based distance sensors, a high number of echoes used for the identification of the objects indicate a low error. Furthermore, the use of a measuring mode for a high distance indicates a lower measuring error, and thus a high probability of the presence of a permissible parking space.

The probability of the presence of a permissible parking space is decreased when one or multiple of the following factors are present: location of the possible parking space on the left side of the street (or on the right side in the case of left-hand traffic), absence of the first or the second reference object when no lateral reference object was identified, or a large distance between the vehicle and the possible parking space. Furthermore, the probability of the presence of a permissible parking space is decreased when the surroundings sensors indicate a high measuring error upon identification of the reference objects. If ultrasound-based distance sensors are used as surroundings sensors, a high measuring error typically exists when only a small number of ultrasound echoes was used for determining the reference objects. Furthermore, the probability is decreased when the ultrasonic sensors were operated in an unfavorable mode for the corresponding distance, for example a mode for a small distance.

If the measuring error is very large, for example due to a low number of echoes used and/or due to an unsuitable operating mode of the ultrasonic sensors for detecting a parking space, the probability that the collected data are not usable also increases. It is therefore conceivable in one refinement of the method to determine also a probability of a faulty detection, in addition to determining a probability of the presence of a permissible parking space. It may be provided to predefine a second limiting value and, if the probability of the presence of a faulty detection exceeds the second limiting value, to completely discard the detected possible parking space and not consider it further in the further course of the method. In addition to the exceeding of the second limiting value, a further criterion may be used. For example, a cluster analysis may be carried out, whereby detected possible parking spaces are discarded if their probability of a faulty detection exceeds the second limiting value and the cluster analysis shows strong noise for the collected data. Strong noise of the data manifests itself, for example, in that the majority of possible parking spaces within a cluster is not assigned to one category, but essentially a uniform distribution among the possible categories exists.

If, for example, a possible parking space is assigned to a category in which the possible parking space is situated on the right side of the street, vehicles were identified as the first and second reference objects and a low curb was identified as the lateral reference, the distance from the vehicle is small, and a parallel parking spot was identified as the parking space type, a high probability of between 80% and 90%, for example, that a permissible parking space is present is assigned to this possible parking space. If, for example, a possible parking space is assigned to a category in which the possible parking space is situated on the left side of the street, only a second reference object was identified, but no first reference object and also no curb as the lateral reference are present, and the distance of the possible parking space from the vehicle is large, a low probability of between 0% and 10%, for example, that a permissible parking space is present, is assigned to this possible parking space.

With the aid of the categorization, a weighting factor is created, which is considered as a factor in the function assigned to a street portion. A sliding window may be used, which is shifted along a location coordinate of the street portion. Within the window, it is considered how the identified possible parking spaces are distributed among the different categories. If all possible parking spaces within the sliding window are distributed to a single category or among few categories, a high weighting factor is assigned. If the possible parking spaces are distributed among many categories, without a concentration occurring, a low weighting factor is assigned. If, for example, all possible parking spaces in the sliding window are assigned to a single category, a weighting factor of 1.5, for example, is assigned. If, in another example, the possible parking spaces are distributed evenly among the categories, a weighting factor of 0.5, for example, is assigned.

The length of the sliding window may correspond to the measuring error in the position determination of the possible parking spaces. The length of the sliding window is in the range of 5 to 10 meters, for example.

In further specific embodiments, the categorization may also be used to discard data containing measuring errors. If, for example, it is identified in a window around a certain position along a street portion that almost all possible parking spaces belong to a certain category, newly ascertained possible parking spaces whose category deviates may be discarded.

The identified possible parking spaces are stored in a database, which is assigned to a central computer facility. The central computer facility is a server, for example, in particular a cloud server. An Internet connection may be used, for example, for the communication between the vehicles and the central computer facility, the Internet connection of the vehicles being implemented with the aid of a mobile communications network, for example. Depending on availability, it is also possible to use other transmission techniques, such as Bluetooth or WLAN connections, or further common car2car or car2infrastructure protocols.

In one embodiment variant of the method, the data collected with the aid of the surroundings sensors of the vehicles are transmitted to the central computer facility, which then carries out the evaluation of the detected possible parking spaces. In one alternative specific embodiment of the method, the evaluation of the detected possible parking spaces is carried out by a system of the vehicle. It is conceivable in one variant to transmit exclusively data on the possible parking spaces whose probability of a permissible parking space exceeds a third predefined limiting value. For example, the third limiting value is established between 40% and 90%, which may be between 50% and 80%, and particularly between 60% and 70%. In one further variant of the method, data on all detected possible parking spaces are transmitted.

A database in which the possible parking spaces are recorded is assigned to the central computer facility. The database stores in particular the position of a possible parking space and the category assigned to the possible parking space. In further specific embodiments of the method, the database may include further information about the possible parking spaces, such as the probability of the presence of a permissible parking space, the parking space type, the length of the parking space, and the width of the parking space.

To detect free spaces and/or parking areas based on the data stored in the database, the central computer facility carries out a cluster analysis. To carry out the cluster analysis, it is possible to use the DBSCAN algorithm (density-based spatial clustering of applications with noise). In this process, possible parking spaces are assigned to a street portion. In one further embodiment variant of the method, it is also possible to assign only the possible parking spaces to a street portion whose probability of the presence of a permissible parking space exceeds the third limiting value.

Depending on the embodiment variant of the method, the cluster analysis may be carried out continuously by the central computer facility, or the cluster analysis is carried out after a predefined time interval has elapsed. The results of the cluster analysis may be buffered, so that the respective previous result of a cluster analysis is available while a new run of the cluster analysis is already in progress.

To ascertain the number of passages of vehicles through a street portion, it is necessary to detect a passage of a vehicle through a certain street portion. This may take place in that the vehicle positions are regularly ascertained with the aid of satellite navigation, and a progression of the vehicle position is assigned to the street portions. With the aid of the satellite navigation, the entire path which this vehicle takes is tracked, so that a passage through a certain street portion is ascertainable when the path of the vehicle is assigned to a digital street map.

It may further be provided that when a passage through a street portion is identified by a vehicle repeatedly identifying a possible parking space. It is provided that the positions of possible parking spaces are stored by the vehicle. When the vehicle passes through this street portion again, the surroundings sensors of the vehicle again search for possible parking spaces, the vehicle also transmitting a piece of information to the central computer facility when now no possible parking space is identified in a previously stored position, i.e., when this parking space is now occupied. Since in this embodiment variant a piece of information is provided to the central computer facility, regardless of whether or not the possible parking space is occupied, it is sufficient for the ascertainment of the number of passages to record the sum of data transmissions. The number of passages is then given by the sum of the data transmissions assigned to the street portion, divided by the number of possible parking spaces identified in this street portion.

It may further be provided to identify a passage of a vehicle through a street portion by ascertaining the intersections crossed by the vehicle. If a street portion is delimited by two intersections, a vehicle entering a street portion may be detected by the crossing of a first intersection assigned to this street portion, and the leaving of this street portion may be detected by the crossing of a second intersection assigned to the street portion. The crossing of an intersection is transmitted in each case by the vehicle to the central computer facility for this purpose.

The pieces of information about the identified free spaces and/or the identified parking areas may be provided by the central computer facility. This may take place, for example, by providing the pieces of information on the Internet. In one variant, it is provided to transmit a position indication to the central computer facility. The central computer facility then reports back pieces of information about identified free spaces and/or parking areas in the surroundings of the indicated position. It particularly may be that when a position indication is transmitted to the central computer facility, and the central computer facility reports back whether an identified free space and/or an identified parking area is situated in the indicated position or in the vicinity of the indicated position. Pieces of information about identified free spaces and/or parking areas may be retrieved by a navigation system or a parking assistance system. For example, a parking assistance system may transmit the position of an identified possible parking space to the central computer facility, whereupon the parking assistance system receives a piece of information as to whether a parking area and/or a free space is situated in the position of the possible parking space.

According to the present invention, furthermore a computer program is provided, according to which one of the methods described herein is carried out when the computer program is being executed on a programmable computer device. For example, the computer program may be a module for implementing a driver assistance system, or a sub-system thereof, in a vehicle, or an application for a driver assistance function, which is executable on a smart phone or tablet, for example. The computer program may be stored on a machine-readable memory medium, such as on a permanent or rewritable memory medium, or in assignment to a computer device, or on a removable CD-ROM, DVD, Blu-Ray disk or a USB stick. In addition or as an alternative, the computer program may be provided for download on a computer device such as on a server or cloud server, for example via a data network such as the Internet, or a communication link such as a telephone line or wireless connection.

A further aspect of the present invention is to provide a central computer facility which is configured to carry out one of the methods described herein. Such a central computer facility is configured as a server or as a cloud server, for example. The central computer facility includes a database which is configured to store pieces of information about possible parking spaces. The central computer facility furthermore may include an arrangement for carrying out a cluster analysis. The central computer facility includes an arrangement for communicating with vehicles and may be connected to a data network, such as the Internet, pieces of information about possible parking spaces being receivable by vehicles via the data network, and pieces of information about ascertained free spaces being provided via the data network.

The central computer facility may be configured to carry out the methods described herein. The features described within the scope of the method apply accordingly to the central computer facility, and vice versa, the features described within the scope of the central computer facility apply accordingly to the method.

According to the present invention, furthermore a device for assisting the driver is provided, which is configured and/or configured to carry out the methods described herein. The features described within the scope of the method apply accordingly to the device, and vice versa, the features described within the scope of the device apply accordingly to the method.

The device includes surroundings sensors which are configured to detect possible parking spaces in the surroundings of a vehicle, and an arrangement for communicating with a central computer facility.

The device furthermore may include an arrangement for evaluating the detected possible parking spaces.

With the aid of the method according to the present invention, it is possible to reliably distinguish between a permissible parking space and a free space in which parking is not permitted. The provided method operates in a two-stage manner, a pre-evaluation of possible parking spaces taking place in a first stage. In the second stage, a cluster analysis takes place, with the aid of which a historic statistical filtration of detected possible parking spaces is carried out by one or multiple vehicles. Free spaces are easily identifiable based on the fact that while these appear as a possible parking space to the surroundings sensors of a vehicle, in practice a vehicle never parks in this area.

Advantageously, the provided method may be used to fully automatically create pieces of information about free spaces and/or parking areas, without requiring any manual data input. This is in particular advantageous when, for example in narrow streets delimited by tall buildings, an offset is created between the vehicle position ascertained with the aid of satellite navigation and the actual vehicle position due to reflections of signals of the navigation satellites, since data stored in the central computer facility also have this offset. In this way, it is possible without problems to inquire, via the central computer facility, whether an identified free space is situated in the indicated position, using a position determined with the aid of satellite navigation.

Due to the automatic evaluation of the data, the pieces of information about free spaces and parking areas may be updated considerably more quickly than would be the case with static map material containing information marked fixedly therein. Changes, for example due to construction sites and events, are incorporated into the map learned according to the method according to the present invention in a very short time.

For the driver of a vehicle, the use of the method means a gain in comfort since the parking assistance system is able to inquire, via the central computer facility, whether a possible parking space is permissible prior to offering the possible parking spot. The driver is thus offered fewer possible parking spaces, which may be free, but do not constitute a permissible parking space. This increases the acceptance of the driver assistance systems by the driver.

Exemplary embodiments of the present invention are shown in the drawings and are described in greater detail in the following description.

In the following description of the exemplary embodiments of the present invention, identical elements are denoted by the same reference numerals, a repeated description of these elements in individual cases being dispensed with. The figures only schematically represent the subject matter of the present invention.

DETAILED DESCRIPTION

Figure 1:
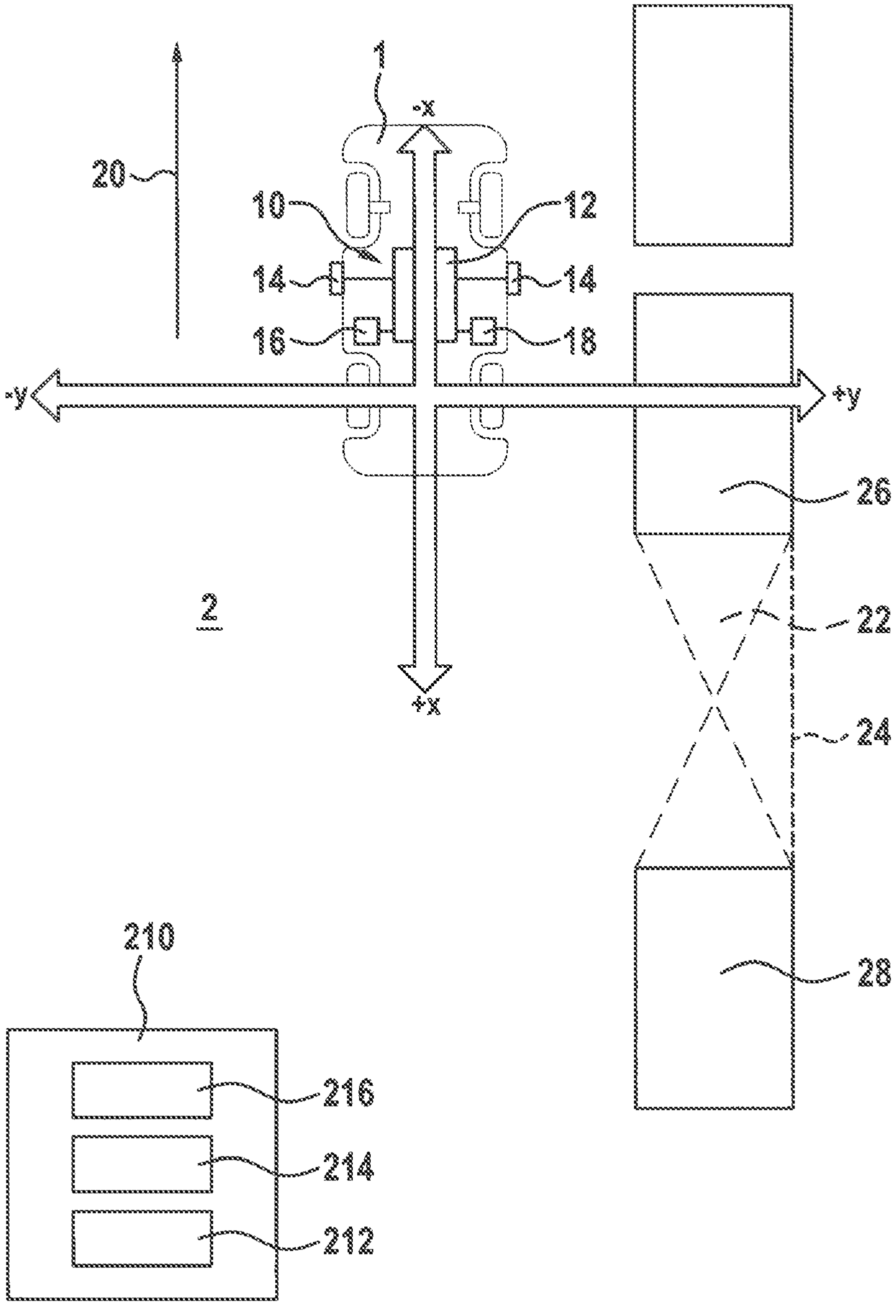
FIG. 1 shows the identification of possible parking spaces by a vehicle.

FIG. 1 shows a vehicle 1 which is moving along a street 2 in a driving direction 20. Vehicle 1 includes a device 10 for assisting the driver, which in turn includes surroundings sensors 14 for detecting possible parking spaces 22 in the surroundings of vehicle 1. Surroundings sensors 14 are configured as distance sensors in the specific embodiment illustrated in FIG. 1 and are oriented to the sides of vehicle 1, one surroundings sensor 14 each being situated on the left vehicle side and on the right vehicle side.

When vehicle 1 passes by possible parking space 22, a rear delimitation 28, a front delimitation 26 and a lateral delimitation 24 are ascertained via surroundings sensors 14. Delimitation 28 thus corresponds to the first reference object, delimitation 26 corresponds to the second reference object, and lateral delimitation 24 corresponds to the lateral reference.

In the specific embodiment of the method illustrated in FIG. 1, it is provided that the pieces of information ascertained about possible parking space 22 are initially evaluated by device 10. For this purpose, device 10 includes a control unit 12, which determines a probability of the presence of a permissible parking space. The identified delimitations 24, 26, 28 are classified for this purpose. In the situation illustrated in FIG. 1, both front delimitation 26 and rear delimitation 28 are vehicles. Furthermore, a curb was established as lateral delimitation 24. With the aid of the identified delimitations 24, 26, 28, the position of possible parking space 22 and its length and width in relation to a vehicle coordinate system are ascertained. The vehicle coordinate system is represented by axes of coordinates in the representation in FIG. 1, the X direction being situated counter to driving direction 20 and the Y direction being free toward the right side of the street. Possible parking space 22 is classified into a category corresponding to the finding.

The result of the evaluation of possible parking space 22 is transmitted together with an indication about its position to a central computer facility 210 via an arrangement for communication 18. The absolute position of possible parking space 22 is determined in that initially its position relative to vehicle 1 is ascertained, and additionally the position of vehicle 1 is determined with the aid of satellite navigation. Device 10 additionally includes a GPS receiver 16 for this purpose.

Central computer facility 210 includes an arrangement for communication for communicating with vehicles 216, via which the same receives the information about possible parking space 22. The information is stored in a database 212. To carry out a cluster analysis, furthermore a processing unit 214 is assigned to central computer facility 210.

In further specific embodiments, the evaluation of possible parking space 22 is carried out by central computer facility 210. For this purpose, the data of surroundings sensors 14 are transmitted by vehicle 1 to central computer facility 210.

Figure 2:
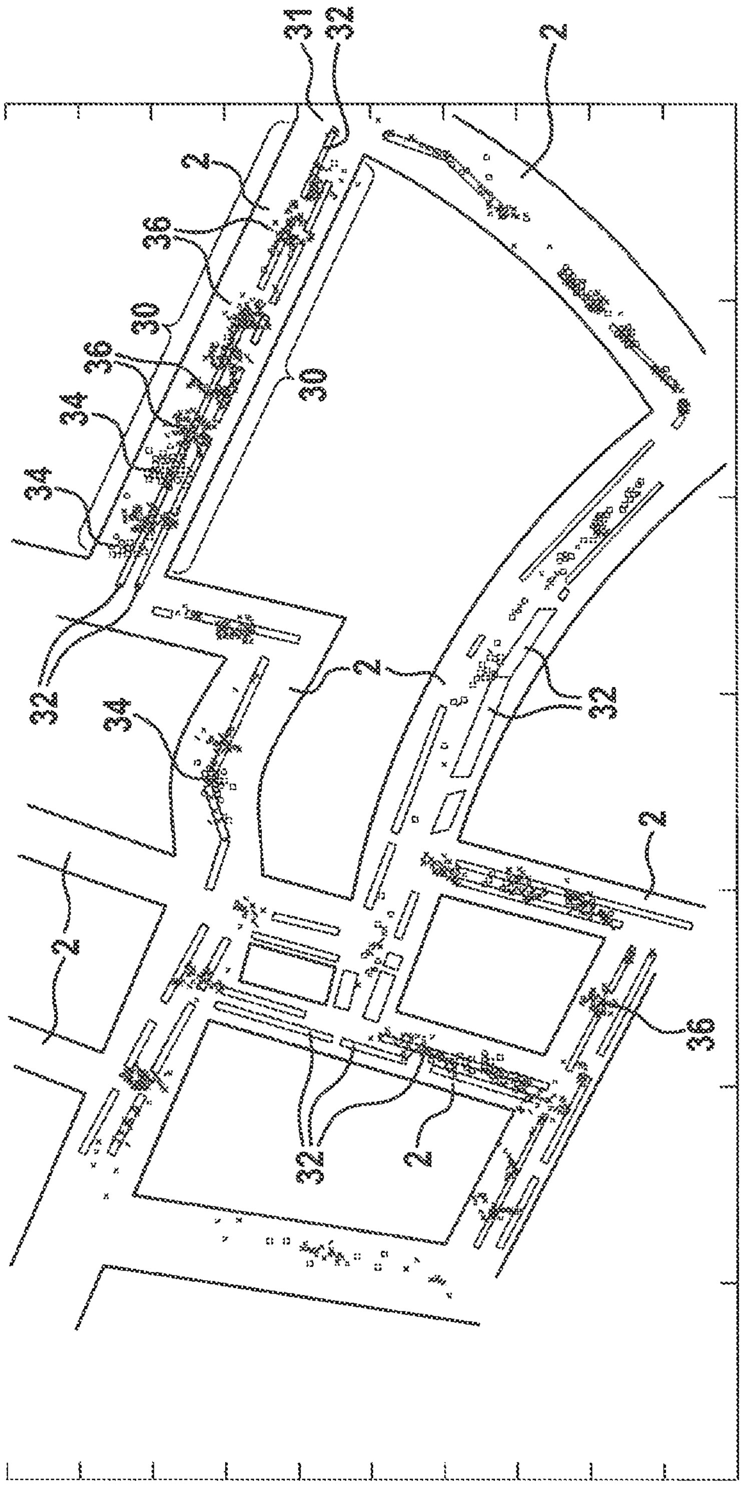
FIG. 2 shows a map including marked possible parking spaces.

FIG. 2 graphically represents the positions of possible parking spaces 22 (compare to FIG. 1). As is derivable from the representation in FIG. 2, concentrations, i.e., clusters, of possible parking spaces 22 occur in areas in which streets 2 are located, positions of possible parking spaces 22 whose probability of the presence of a permissible parking space is greater than the third limiting value being represented as open squares 34 in the representation in FIG. 2, and positions of possible parking spaces 22 whose probability is below the third limiting value being plotted as crosses 36. With the aid of a cluster analysis, it is possible to assign the positions of possible parking spaces 22 to street portions 30.

Figure 3:
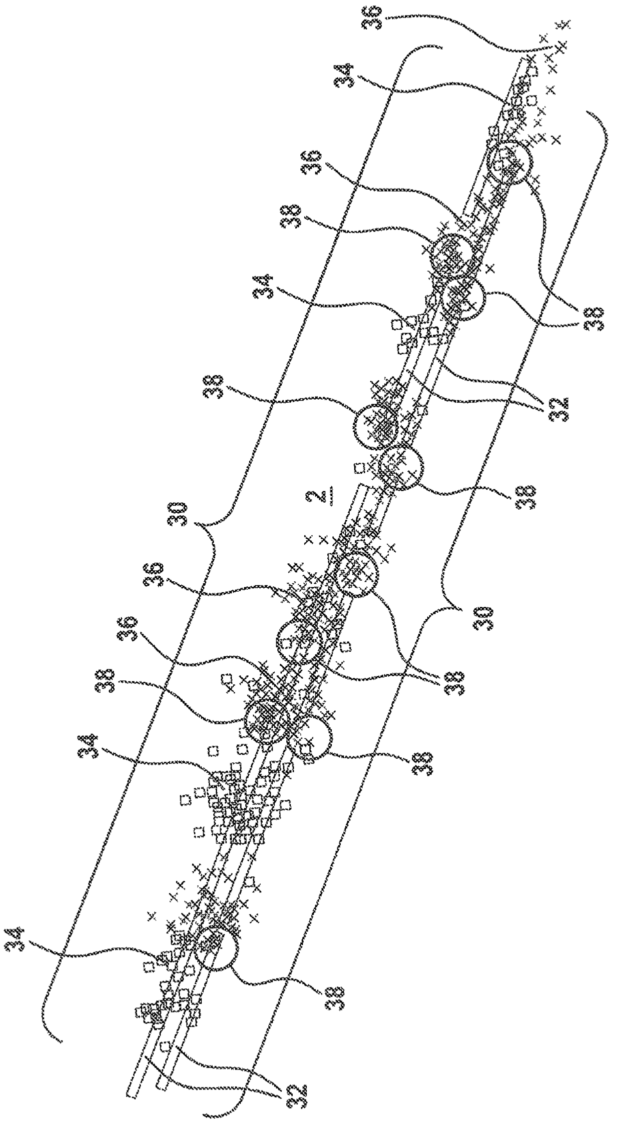
FIG. 3 shows possible parking spaces assigned to a street portion.

FIG. 3 shows a street 2 from the representation in FIG. 2 in an enlarged manner. Street 2 includes exactly two street portions 30, one for each driving direction. In addition, permissible parking areas 32 and free spaces 38 are plotted in the representation in FIG. 3. As is derivable from the representation of FIG. 3, concentrations of ascertained possible parking spaces 22 occur in particular at the borders between permissible parking areas 32 and free spaces 38. This is due to the fact that drivers may park their vehicle at a delimitation of a permissible parking area 32.

Figure 4:
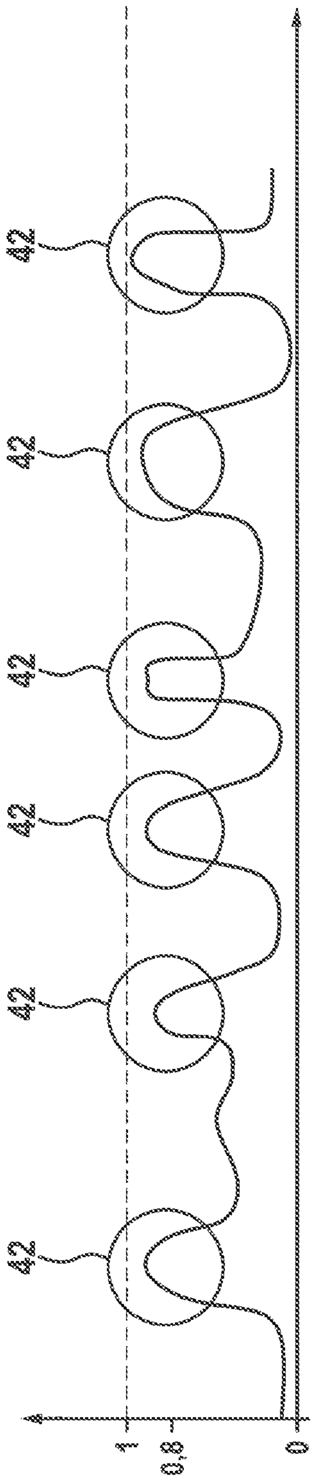
FIG. 4 shows a representation of a function for the presence of a free space and/or a parking area in a street portion.

FIG. 4 shows a progression of the function of the quotient of frequency of the detection of a possible parking space and the number of vehicle passages and the weighting factor for one of the two street portions 30 of FIG. 3. The GPS position along street portion 30 is plotted on the X axis, and the quotient between 0 and 1 is plotted on the Y axis. It is derivable from the representation of FIG. 4 that the function assumes a value greater than 0.8 in areas 42. These areas correspond to free spaces 38 plotted in FIG. 3. The areas in which the function assumes a value in the range of 0.1 to 0.5 correspond to permissible parking areas 32.

The present invention is not limited to the exemplary embodiments described here and the aspects highlighted therein. Rather, a plurality of modifications are possible within the scope described by the claims, which are within the capabilities of those skilled in the art.

What is claimed is:

1. A method for identifying at least one of free spaces in which parking is not permitted and parking areas in which parking is permitted, in which vehicles transmit pieces of information about possible parking spaces to a central computer facility, the method comprising:

detecting positions of possible parking spaces along a street with the aid of data from surroundings sensors of the vehicles;

evaluating the detected possible parking spaces based on the data collected by the surroundings sensors, wherein a categorization of at least one object delimiting the detected possible parking spaces is carried out;

recording the possible parking spaces, together with the positions, in a database of the central computer facility; and evaluating the data stored in the database using a cluster analysis, wherein possible parking spaces are assigned to a street portion when the cluster analysis is carried out, a function being assigned to the street portion which is given by the quotient of the frequency of the detections of a possible parking space in a certain position along the street portion and the number of passages of vehicles through this street portion and a weighting factor, formed from the evaluating, wherein at least one of: a presence of a free space in which parking is not permitted is inferred when the function value is greater than a predefined limiting value, or a presence of a parking area in which parking is permitted is inferred when the function value is within a predefined range.

2. The method of claim 1, wherein the surroundings sensors of the vehicles include distance sensors, wherein possible parking spaces are detected during passing.

3. The method of claim 1, wherein the position of a possible parking space is determined using a position ascertained by the surroundings sensors relative to the vehicle and a vehicle position ascertained with the aid of satellite navigation.

4. The method of claim 1, wherein a detected possible parking space is evaluated by the vehicle which has detected the possible parking space.

5. The method of claim 1, wherein a passage of a vehicle through the street portion is identified by at least one of the following:

regularly ascertaining the vehicle position with the aid of satellite navigation and assigning the progression of the vehicle position to the street portion;

ascertaining and evaluating intersections crossed by the vehicle, the street portion being delimited by two intersections; and the vehicle repeatedly identifying a possible parking space, during a passage through a street portion the positions of possible parking spaces being stored by the vehicle and a piece of information being transmitted to the central computer facility during a repeat passage when no possible parking space is identified in a previously stored position, the number of passages through the street portion being given by the sum of the data transmissions assigned to the street portion and the number of possible parking spaces identified in this street portion.

6. The method of claim 1, wherein pieces of information about identified free spaces are provided by the central computer facility.

7. The method of claim 6, wherein a position indication is transmitted to the central computer facility and the central computer facility reports back pieces of information about identified free spaces in the surroundings or in the indicated position.

8. A non-transitory machine-readable storage medium having program instructions, which when executed by a processor perform a method, the method comprising:

detecting positions of possible parking spaces along a street with the aid of data from surroundings sensors of the vehicles;

evaluating the detected possible parking spaces based on the data collected by the surroundings sensors, wherein a categorization of at least one object delimiting the detected possible parking spaces is carried out;

recording the possible parking spaces, together with the positions, in a database of the central computer facility; and evaluating the data stored in the database using a cluster analysis, wherein possible parking spaces are assigned to a street portion when the cluster analysis is carried out, a function being assigned to the street portion which is given by the quotient of the frequency of the detections of a possible parking space in a certain position along the street portion and the number of passages of vehicles through this street portion and a weighting factor, formed from the evaluating, wherein at least one of: a presence of a free space in which parking is not permitted is inferred when the function value is greater than a predefined limiting value, or a presence of a parking area in which parking is permitted is inferred when the function value is within a predefined range.

9. A central computer facility, comprising:

a database;

a processing unit; and a communicating arrangement to communicate with a vehicle, wherein the central computer facility is configured for identifying at least one of free spaces in which parking is not permitted and parking areas in which parking is permitted, in which vehicles transmit pieces of information about possible parking spaces to a central computer facility, by performing the following:

detecting positions of possible parking spaces along a street with the aid of data from surroundings sensors of the vehicles;

evaluating the detected possible parking spaces based on the data collected by the surroundings sensors, wherein a categorization of at least one object delimiting the detected possible parking spaces is carried out;

recording the possible parking spaces, together with the positions, in the database of the central computer facility; and evaluating the data stored in the database using a cluster analysis, wherein possible parking spaces are assigned to a street portion when the cluster analysis is carried out, a function being assigned to the street portion which is given by the quotient of the frequency of the detections of a possible parking space in a certain position along the street portion and the number of passages of vehicles through this street portion and a weighting factor, formed from the evaluating, wherein at least one of: a presence of a free space in which parking is not permitted is inferred when the function value is greater than a predefined limiting value, or a presence of a parking area in which parking is permitted is inferred when the function value is within a predefined range.

10. A device for assisting a driver, comprising:

surroundings sensors for detecting possible parking spaces along a street in the surroundings of a vehicle;

a communicating arrangement to communicate with a central computer facility, wherein the device is configured for identifying at least one of free spaces in which parking is not permitted and parking areas in which parking is permitted, in which vehicles transmit pieces of information about possible parking spaces to a central computer facility, by performing the following:

detecting positions of possible parking spaces along the street with the aid of data from the surroundings sensors of the vehicles;

evaluating the detected possible parking spaces based on the data collected by the surroundings sensors, wherein a categorization of at least one object delimiting the detected possible parking spaces is carried out;

recording the possible parking spaces, together with the positions, in the database of the central computer facility; and evaluating the data stored in the database using a cluster analysis, wherein possible parking spaces are assigned to a street portion when the cluster analysis is carried out, a function being assigned to the street portion which is given by the quotient of the frequency of the detections of a possible parking space in a certain position along the street portion and the number of passages of vehicles through this street portion and a weighting factor, formed from the evaluating, wherein at least one of: a presence of a free space in which parking is not permitted is inferred when the function value is greater than a predefined limiting value, or a presence of a parking area in which parking is permitted is inferred when the function value is within a predefined range.

11. The method of claim 1, wherein the data from the surroundings sensors includes data regarding a first object that delimits a rear of the possible parking space, a second object that delimits a front of the possible parking space, and a lateral object that delimits a side of the possible parking space.

12. The method of claim 1, wherein the categorization categorizes a delimitation of a rear or a front of the possible parking space as at least one of: a vehicle, no object, or unknown.

13. The method of claim 1, wherein the categorization categorizes a delimitation of a side of the possible parking space as at least one of: curb, no curb, high object, or unknown.

* * * * *